United States Patent [19]
Dudley

[11] Patent Number: 5,135,101
[45] Date of Patent: Aug. 4, 1992

[54] DIVERTER OF ARTICLES ON CONVEYOR
[75] Inventor: David E. Dudley, San Jose, Calif.
[73] Assignee: Peco Controls Corporation, Milpitas, Calif.
[21] Appl. No.: 771,049
[22] Filed: Oct. 2, 1991
[51] Int. Cl.$^5$ ............................................. B65G 47/26
[52] U.S. Cl. .................................... 198/438; 198/372
[58] Field of Search ................. 198/372, 436, 438, 493

[56] References Cited

U.S. PATENT DOCUMENTS

| | | | |
|---|---|---|---|
| 3,603,645 | 9/1971 | Hardy | 198/493 |
| 3,685,632 | 8/1972 | Brady | 198/438 X |
| 3,721,340 | 3/1973 | Kruse et al. | 198/438 X |
| 4,321,994 | 3/1982 | Heuft | 198/438 X |
| 4,474,295 | 10/1984 | Braschos | 198/436 X |
| 4,986,407 | 1/1991 | Heuft | 198/438 X |

FOREIGN PATENT DOCUMENTS 0425989  3/1935  France ................................ 198/438

Primary Examiner—Robert P. Olszewski
Assistant Examiner—Bidwell: James R.
Attorney, Agent, or Firm—Law Offices of Thomas E. Schatzel

[57] ABSTRACT

A diverter changes the conveyor path of successive articles from a single succession to at least two successions of articles. The diverter includes a wheel mounted for rotation in a common plane with the path of the single succession of articles and being movable between one location adjacent the path and other location interposed within the path. The wheel has a top peripheral edge defining a series of radial vanes and pressurized air is directed towards the vanes upstream relative to the path of articles for spinning the wheel towards the succession of articles. The wheel has a resilient, shock-absorbing, peripheral surface for contacting articles and can be adjusted in elevation to contact articles at the same level as the articles center of mass. A flow control valve and conduit direct an air blast transversely of the single succession of articles path at a location slightly upstream of the wheel so as to accelerate articles after contact with the wheel to move along the path of articles guided from the wheel.

11 Claims, 1 Drawing Sheet

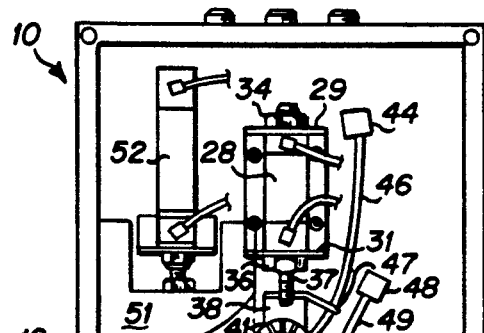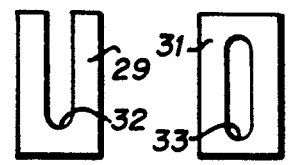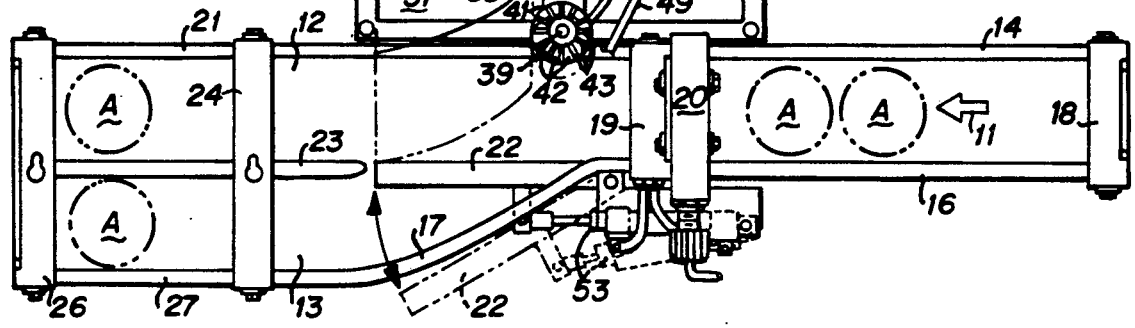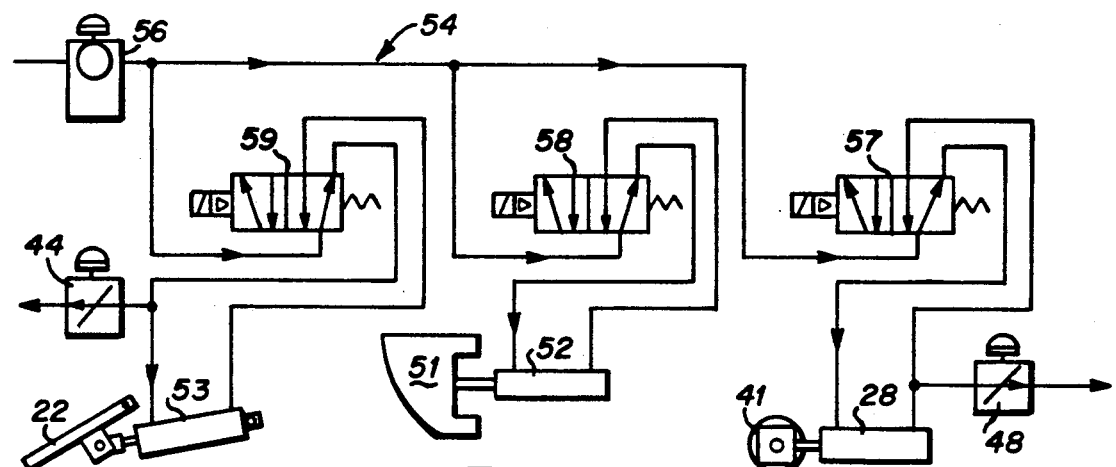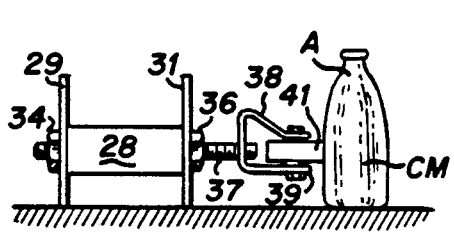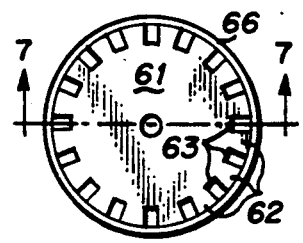

DIVERTER OF ARTICLES ON CONVEYOR

BACKGROUND OF THE INVENTION

1. Field of the Invention

This invention relates to a diverter of articles, such as bottles or cans, from one conveyor path to another. More specifically, it concerns apparatus for changing the path of successive articles from a single succession of articles to at least two successions of articles by interposing a guide into the path of the single succession of articles after passage of successive articles and by directing an air blast towards each article that contacts the guide.

2. Description of the Prior Art

Air blasts have been used for diverting articles from one conveyor path to another. Guides, such as a rigid surface oblique to an article path, have been interposed into the path for changing a single succession of articles to at least two successions of articles. A problem encountered with oblique surfaces is the collisions of articles with the surfaces and with each other resulting in backups of articles near the surfaces. Upon striking the surface, an articles rate of travel along a conveyor path is retarded and a closely following article can collide with the article at the surface. Thereafter, subsequent articles can collide with the following article and with each other.

Articles such as bottles often lack stability against overturning because of a small bottom area and a high center of mass. When such articles collide with a guide or with each other, there is a possibility of overturning and jamming the conveyor path. When guides are rigid and have no shock-absorbing quality, articles striking the guide tend to rebound immediately in a predetermined direction. Preceeding articles can limit the rebound travel in the predetermined direction, while the conveyor tends to move the article along the original conveyor path.

SUMMARY OF THE INVENTION

An object of the present invention is to divert articles from one conveyor path to another without retarding the articles rate of travel.

Another object of the invention is to handle articles in a manner as to avoid collisions and backups of articles along a conveyor path.

A further object of the invention is to handle articles in a manner as to maintain the stability of the articles.

According to the present invention, a diverter changes the conveyor path of successive articles from a single succession of articles to at least two successions of articles. An actuator positioned support has mounted thereon a wheel for rotation in a common plane with the path of the single succession of articles. The wheel has a top peripheral edge defining a series of radial vanes. Pressurized air is directed towards the top peripheral edge of the wheel upstream relative to the path of articles to contact the vanes and spin the wheel towards the succession of articles. The wheel can be held in one location adjacent the path of the single succession of articles allowing the articles to continue along the path and in another location interposed within the path guiding another succession of articles therefrom.

In a preferred embodiment of the invention, an air blast is directed transversely of the single succession of articles path at a location slightly upstream of the wheel so as to accelerate articles after contact with the wheel to move along the path of articles guided from the wheel. The air blast is controlled by pneumatic controls that simultaneously direct the air blast and interpose a guide wheel into the path of the single succession of articles. The wheel has a resilient, shock-absorbing, peripheral surface made of silicone rubber for contacting articles. The wheel can be adjusted in elevation to contact articles at the same level as the articles center of mass. A curved rail guides articles from the wheel along a natural path for the succession of articles guided from the wheel. A gate that can be positioned to close the natural path for articles guided from the wheel is operated by pneumatic controls that simultaneously open the gate and direct air for spinning the wheel.

Advantages of the invention include the diversion of articles without retarding the articles rate of travel, avoidance of collisions and backups of articles along a conveyor path, and maintenance of article stability.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is a diagrammatic plan view of a diverter embodying the present invention;

FIG. 2 is an elevational view of a grooved end plate for supporting a pneumatic acutator;

FIG. 3 is an elevational view of a slotted end plate for supporting a pneumatic actuator;

FIG. 4 is an elevational view illustrating that the guide wheel can be positioned to contact articles at the same level as the articles center of mass;

FIG. 5 is a schematic diagram of the pneumatic controls;

FIG. 6 is an enlarged plan view of a modified form of guide wheel; and

FIG. 7 is a section taken on the line 7—7 of FIG. 6.

DESCRIPTION OF THE PREFERRED EMBODIMENT

With reference to FIG. 1, a diverter, indicated by general reference numeral 10, is positioned for changing a conveyor path of articles A, such as bottles or cans, from a single succession of articles moving in the direction of arrow 11 on a conveyor 12 to at least two successions of articles, one continuing on conveyor 12 and another moving in the same direction on a parallel conveyor 13. The conveyor path of the single succession of articles is defined between an upstream straight rail 14 and an upstream portion 16 of a curved rail 17. The rails are interconnected by weldment collars 18 and 19. Adjacent collar 19 is a sensor-assembly 20. The conveyor path of the succession of articles that continue on conveyor 12 is defined between a downstream straight rail 21, an auxiliary gate 22 and a center rail 23. The downstream straight rail and the center rail are interconnected by a center rail collar 24 and an exit collar 26. The conveyor path of the succession of articles that moves along conveyor 13 is defined by the center rail, the curved rail and a downstream portion 27 of the curved rail. The downstream portion of the curved rail and the center rail are interconnected by the center rail collar 24 and an exit collar 26. The conveyor path of the succession of articles that moves along conveyor 13 is defined by the center rail, the curved rail and a downstream portion 27 of the curved rail. The downstream portion of the curved rail and the center rail are interconnected by the center rail collar and the exit collar A pneumatic actuator 28 is mounted within end plates 29 and 31. As shown in FIG. 2, end plate 29 has a U-shaped groove 32 and end plate 31 has an elongated slot 33. As shown in FIGS. 1 and 4, threaded end portions of the actuator project through the groove and slot and have nuts 34 and 36 fitted thereon for locking the actuator in place at a desired elevation. The actuator has an extensible arm 37 with clevis 38 attached thereto. The clevis has a pin 39 that is an actuator positioned support for mounting a guide wheel 41. This wheel can be positioned, as shown in solid line in FIG. 1, adjacent the path of the single succession of articles or it can be positioned as indicated in dashed line, interposed within the path of the single succession of articles. As shown in FIG. 4, the desired elevation for mounting the actuator is such that the wheel is positioned to contact articles at the same level as the center of mass C.M. of the articles. The wheel rotates in a common plane with the single succession of articles and the wheel is preferrably made of a resilient, shock-absorbing material, such as silicone rubber. Thus, the peripheral edge of the wheel that contacts articles maintains contact with the articles while absorbing the collision impact. As shown in FIG. 1, the wheel has a top peripheral edge defining a series of radial vanes 42. Between the vanes are channels 43 of rectangular cross-sectional shape that extend radially inward from the peripheral edge of the wheel.

Looking again at FIG. 1, a flow control valve 44 supplies air to a conduit 46 that directs pressurized air towards the radial vanes 42 at the top peripheral edge of the guide wheel 41. The conduit slidably fits through an opening in a support 47 projecting from the clevis 38. A flow control valve 48 supplies air to a conduit 49 that directs an air blast transversely of the single succession of articles path at a location slightly upstream of the wheel so as to accelerate articles after contact with the wheel to move along the path of the other succession of articles guided from the wheel. A guide 51 is operated by an actuator 52 for moving the guide from the solid line position out of the path of articles on conveyor 12 to the phantom line position blocking conveyor 12. The auxiliary gate 22 is operated by an actuator 53 for moving the gate from the solid line position in which the path to conveyor 13 is blocked to the phantom line position in which the path is open.

Looking now at FIG. 5, air is supplied to a pneumatic control circuit, indicated by general reference numeral 54, through an air-in regulator 56. Air from the regulator is fed to air valves 57, 58 and 59 that are four-way, solenoid controlled valves with spring returns. Air valve 57 controls air flow to the pneumatic actuator 28 and the blast air, flow control valve 48. In the position shown, air flows to the forward end of the actuator cylinder retracting the guide wheel 41. When valve 57 is shifted to its other position, air flows to the blast air, flow control valve and the rear end of the actuator cylinder for extending the guide wheel. Air valve 58 controls air flow to the actuator 52 that operates the guide 51. In the position shown, air flows to the forward end of the actuator 52 cylinder retracting the guide, while shifting the air valve 58 to its other position causes air to flow to the rear end of the cylinder for extending the guide. Air valve 59 controls air flow to the actuator 53 that operates the auxiliary gate 22 and to the flow control valve 44 that controls air for spinning the guide wheel 41.

FIGS. 6 and 7 illustrate a modified form of guide wheel 61 having radial vanes 62 at the top peripheral edge with channels 63 of rectangular cross-sectional shape interposed between the vanes. Thus, the top surface of the wheel resembles a ring gear. The wheel can be molded of a hard plastic material. A circumferential groove 64 is provided in the peripheral edge of the wheel and a silicone rubber O-ring 66 fits within the circumferential groove to provide a resilient, shock-absorbing peripheral surface for contacting articles.

From the foregoing description, it will be seen that a diverter 10 changes the conveyor path of successive articles A from a single succession of articles on conveyor 12 to at least two successions of articles, one continuing on conveyor 12 and another on parallel conveyor 13. An actuator positioned support 39 has mounted thereon a wheel 41 for rotation in a common plane with the path of the single succession of articles. The wheel has a top peripheral edge defining a series of radial vanes 42. Pressurized air is directed by a flow control valve 44 and a conduit 46 towards the top peripheral edge of the wheel upstream relative to the path of articles to contact the vanes and spin the wheel towards the succession of articles. The wheel can be held in one location adjacent the path of the single succession of articles allowing the articles to continue along the path of conveyor 12 and in another location interposed within the path guiding another succession of articles therefrom to parallel conveyor 13. A flow control valve 48 and a conduit 49 direct an air blast transversely of the single succession of articles path at a location slightly upstream of the guide wheel 41 so as to accelerate articles A after contact with the wheel to move along the path of articles guided from the wheel. Simultaneously, air is directed to the actuator 28 that interposes the guide wheel into the path of the single succession of articles.

Although the present invention has been described in terms of the presently preferred embodiment, it is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A diverter for changing the conveyor path of successive articles from a single succession of articles to at least two successions of articles, said diverter comprising an actuator positioned support that can be held in one location adjacent the path of the single succession of articles and in another location closer to the path;

a wheel mounted on the support for rotation in a common plane with the path of the single succession of articles, said wheel being adjacent the path of the single succession of articles when the support is held in one location and interposed within the path of the single succession of articles when the support is held in the location closer to the path, said wheel having a top peripheral edge defining a series of radial vanes; and means for directing pressurized air towards the peripheral edge of the wheel upstream relative to the path of articles to contact the vanes and spin the wheel towards the succession of articles;

whereby one succession of articles can continue along the path when the wheel is adjacent thereto and when the wheel is interposed within the path another succession of articles is guided therefrom by the spinning wheel.

2. The diverter of claim 1 further including means for directing an air blast transversely of the single succession of articles path at a location slightly upstream of the wheel so as to accelerate articles after contact with the wheel to move along the path of the other succession of articles guided from the wheel.

3. The diverter of claim 2 wherein said means for directing an air blast is controlled by pneumatic controls that simultaneously direct an air blast and interpose said actuator positioned support into the path of the single succession of articles.

4. The diverter of claim 1 wherein the wheel has a resilient, shock-absorbing, peripheral surface for contacting articles.

5. The diverter of claim 4 wherein said wheel is made of silicone rubber.

6. The diverter of claim 1 wherein the wheel has a resilient, shock-absorbing peripheral surface formed by an O-ring for contacting articles.

7. The diverter of claim 1 wherein said actuator positioned support and said wheel can be adjusted in elevation so that the wheel will contact articles at the same level as the center of mass of the article.

8. The diverter of claim 1 further including a curved rail that guides the other succession of articles from the spinning wheel along a natural path.

9. The diverter of claim 8 further including a gate that can be positioned to project from the curved rail to close the natural path of the other succession of articles or can be retracted behind the rail to open the path.

10. The diverter of claim 9 wherein said gate is operated by pneumatic controls that simultaneously open the gate and direct air for spinning the wheel.

11. A diverter for changing the conveyor path of successive articles from a single succession of articles to at least two successions of articles, said diverter having an actuator positioned guide that can be held in one location adjacent the path of the single succession of articles for allowing one succession of articles to continue along the path and in another location interposed within the path for guiding another succession of articles therefrom, the improvement comprising:

said guide being a wheel mounted for rotation in a common plane with the path of the single succession of articles, said wheel having a top peripheral edge defining a series of radial vanes, and means for directing pressurized air towards the top peripheral edge of the wheel upstream relative to the path of articles to contact the vanes and spin the wheel towards the succession of articles.

* * * * *